US012156017B2

(12) United States Patent
Tsingos et al.

(10) Patent No.: US 12,156,017 B2
(45) **Date of Patent: *Nov. 26, 2024**

(54) METHODS, APPARATUS AND SYSTEMS FOR POSITION-BASED GAIN ADJUSTMENT OF OBJECT-BASED AUDIO

(71) Applicants: DOLBY LABORATORIES LICENSING CORPORATION, San Francisco, CA (US); DOLBY INTERNATIONAL AB, Dublin (IE)

(72) Inventors: Nicolas R. Tsingos, San Francisco, CA (US); David S. McGrath, Rose Bay (AU); Freddie Sanchez, Berkeley, CA (US); Antonio Mateos Sole, Barcelona (ES)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,063

(22) Filed: Jul. 15, 2023

(65) Prior Publication Data

US 2024/0031768 A1 Jan. 25, 2024

Related U.S. Application Data

(60) Continuation of application No. 17/467,112, filed on Sep. 3, 2021, now Pat. No. 11,743,674, which is a (Continued)

(51) Int. Cl.
*H04S 7/00* (2006.01)

(52) U.S. Cl.
CPC .......... *H04S 7/308* (2013.01); *H04S 2400/11* (2013.01); *H04S 2400/13* (2013.01)

(58) Field of Classification Search
CPC .. H04S 7/308; H04S 2400/11; H04S 2400/13; H04S 7/301; H04S 7/00; H04R 5/02; H04R 29/00

(Continued)

(56) References Cited

U.S. PATENT DOCUMENTS

| | | | |
|---|---|---|---|
| 8,363,865 | B1 | 1/2013 | Bottum |
| 9,905,231 | B2 | 2/2018 | Oh |

(Continued)

FOREIGN PATENT DOCUMENTS

| | | | |
|---|---|---|---|
| RS | 1332 | U | 8/2013 |
| WO | 2006/091540 | | 8/2006 |

(Continued)

OTHER PUBLICATIONS

Stanojevic, Tomislav "3-D Sound in Future HDTV Projection Systems," 132nd SMPTE Technical Conference, Jacob K. Javits Convention Center, New York City, New York, Oct. 13-17, 1990, 20 pages.

(Continued)

*Primary Examiner* — Yosef K Laekemariam

(57) ABSTRACT

The positions of a plurality of speakers at a media consumption site are determined. Audio information in an object-based format is received. Gain adjustment value for a sound content portion in the object-based format may be determined based on the position of the sound content portion and the positions of the plurality of speakers. Audio information in a ring-based channel format is received. Gain adjustment value for each ring-based channel in a set of ring-based channels may be determined based on the ring to which the ring-based channel belongs and the positions of the speakers at a media consumption site.

6 Claims, 6 Drawing Sheets

Related U.S. Application Data continuation of application No. 16/851,656, filed on Apr. 17, 2020, now Pat. No. 11,115,776, which is a division of application No. 16/017,715, filed on Jun. 25, 2018, now Pat. No. 10,631,116, which is a continuation of application No. 15/037,193, filed as application No. PCT/US2014/066830 on Nov. 21, 2014, now Pat. No. 10,034,117.

(60) Provisional application No. 61/915,938, filed on Dec. 13, 2013, provisional application No. 61/910,094, filed on Nov. 28, 2013.

(58) Field of Classification Search
USPC .......................................... 381/58, 300, 303
See application file for complete search history.

(56) References Cited

U.S. PATENT DOCUMENTS

| | | | | |
|---|---|---|---|---|
| 2005/0254662 | A1* | 11/2005 | Blank | H04S 7/301 381/55 |
| 2009/0247295 | A1 | 10/2009 | Weldon | |
| 2010/0189281 | A1 | 7/2010 | Oh | |
| 2011/0013790 | A1 | 1/2011 | Hilpert et al. | |
| 2011/0299706 | A1 | 12/2011 | Sakai | |
| 2013/0202129 | A1 | 8/2013 | Kraemer | |
| 2015/0150066 | A1* | 5/2015 | Park | H04N 21/435 725/110 |
| 2015/0194158 | A1 | 7/2015 | Oh | |
| 2015/0271622 | A1 | 9/2015 | Dausel | |
| 2015/0350802 | A1 | 12/2015 | Jo et al. | |
| 2016/0104491 | A1 | 4/2016 | Lee | |
| 2016/0127847 | A1* | 5/2016 | Shi | H04S 7/301 381/23 |
| 2016/0133261 | A1 | 5/2016 | Shi et al. | |

FOREIGN PATENT DOCUMENTS

| | | | |
|---|---|---|---|
| WO | 2008/150141 | | 12/2008 |
| WO | WO2012122397 | | 9/2012 |
| WO | 2013006330 | | 1/2013 |
| WO | 2013006338 | A2 | 1/2013 |
| WO | 2013/064957 | | 5/2013 |
| WO | 2013/144286 | | 10/2013 |

OTHER PUBLICATIONS

Stanojevic, Tomislav "Surround Sound for a New Generation of Theaters," Sound and Video Contractor, Dec. 20, 1995, 7 pages.
Stanojevic, Tomislav "Virtual Sound Sources in the Total Surround Sound System," SMPTE Conf. Proc., 1995, pp. 405-421, 18 pages.
Stanojevic, Tomislav et al. "Designing of TSS Halls," 13th International Congress on Acoustics, Yugoslavia, 1989, pp. 326-331. 6 pages.
Stanojevic, Tomislav et al. "Some Technical Possibilities of Using the Total Surround Sound Concept in the Motion Picture Technology," 133rd SMPTE Technical Conference and Equipment Exhibit, Los Angeles Convention Center, Los Angeles, California, Oct. 26-29, 1991, 3 pages.
Stanojevic, Tomislav et al. "The Total Surround Sound (TSS) Processor," SMPTE Journal, Nov. 1994, pp. 734-740.
Stanojevic, Tomislav et al. "The Total Surround Sound System (TSS System)", 86th AES Convention, Hamburg, Germany, Mar. 7-10, 1989, 21 pages.
Stanojevic, Tomislav et al. "TSS Processor" 135th SMPTE Technical Conference, Los Angeles Convention Center, Los Angeles, California, Society of Motion Picture and Television Engineers, Oct. 29-Nov. 2, 1993, 22 pages.
Stanojevic, Tomislav et al. "TSS System and Live Performance Sound" 88th AES Convention, Montreux, Switzerland, Mar. 13-16, 1990, 27 pages.

* cited by examiner

METHODS, APPARATUS AND SYSTEMS FOR POSITION-BASED GAIN ADJUSTMENT OF OBJECT-BASED AUDIO

CROSS REFERENCE TO RELATED APPLICATIONS

This application is a continuation of U.S. patent application Ser. No. 17/467,112, filed Sep. 3, 2021, which is a continuation of U.S. patent application Ser. No. 16/851,656, filed Apr. 17, 2020 (Now U.S. Pat. No. 11,115,776), which in turns is a division of U.S. patent application Ser. No. 16/017,715, filed Jun. 25, 2018 (Now U.S. Pat. No. 10,631,116), which in turn is a continuation of U.S. patent application Ser. No. 15/037,193, filed May 17, 2016 (now U.S. Pat. No. 10,034,117), which in turn is the 371 national stage of PCT/US2014/066830, filed Nov. 21, 2014. PCT/US2014/066830 claims priority to U.S. Provisional Patent application No. 61/910,094 filed on Nov. 28, 2013 and U.S. Provisional Patent application No. 61/915,938 filed on Dec. 13, 2013, each of which is hereby incorporated by reference in its entirety.

FIELD OF THE DISCLOSURE

The disclosure generally relates to augmenting audio after generation and before playback for a higher quality listening experience. More specifically, the disclosure relates to adjusting the gain value applied to audio obtained in object-based and ring-based channel formats.

BACKGROUND

A media device at a media consumption site may receive audio information from a content generator in an object-based format. The media device may be a television, a portable computing device such as a phone or a tablet, or a device at a movie theater. The audio information may comprise audio items, where each audio item comprises portions of audio content and position metadata indicating a location in a virtual sound plane at which the sound content portion is intended to play. Position values corresponding to a content portion may be associated with time values that indicate the positions at which the content portion is to be played at each of a plurality of different times. The location may be a location relative to an expected location of the listener or relative to the screen at which related video will played at the media consumption site. For example, a particular audio item may indicate that a certain content portion is to first to be played to the left of the seating area, then behind the seating area, and then to the right of the seating area. The playing of the audio content portions at these positions may simulate the sound of an object flying around the listener.

Audio content may also be received in ring-based channel format. Audio information in a ring-based channel format indicates the "position" of a sound by indicating an amount of signal corresponding to each channel of a set of channels. Each channel in the set of channels corresponds to a position on an imaginary ring of a set of imaginary rings of different height surrounding a particular point or area that may represent the expected location of a listener. As an example, particular content may be intended to be heard from the back left and upper portion of a room by a listener. Audio information associated with the particular content may specify a large amount of signal for a channel corresponding to a particular position on a particular ring, where the plane of the particular ring is higher than ear-level and the particular position on the particular ring is behind and to the left of the expected location of the listener. The audio information may also indicate smaller, but non-zero, signal amounts for other positions on the particular ring, and other rings, that are located nearby to the particular position on the particular ring.

A renderer at a media consumption site may render the received audio content by determining, for each audio content portion that is to be played, the amount of audio signal that should be sent to each speaker at the media consumption site for the audio content portion.

The rendering of audio content in object-based audio format and ring-based channel format may create undesired results in certain speaker configurations, particularly when there are too few speakers in certain areas of the media consumption site. For example, if certain audio content has an intended position of being behind the seating area and there are no speakers behind the seating area, playing that audio content through any other speaker without any augmentation may create an audio effect that is different than intended by the content producers.

Additionally, in some cases, playing the audio content through some other speaker without any augmentation may affect the audibility of other audio components. Consider an example where audio content comprising music is intended to be played at speakers behind the seating area while audio content comprising dialog is intended to be played at speakers in front of the seating area. At a particular media consumption site, there may be no speakers behind the seating area. At such a particular media consumption site, the music audio content may be played in front of the seating area. However, mixing both music audio content and dialog audio content may impair the audibility of the dialog audio content for a listener at the media consumption site.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

DESCRIPTION OF EXAMPLE EMBODIMENTS

Figure 1:
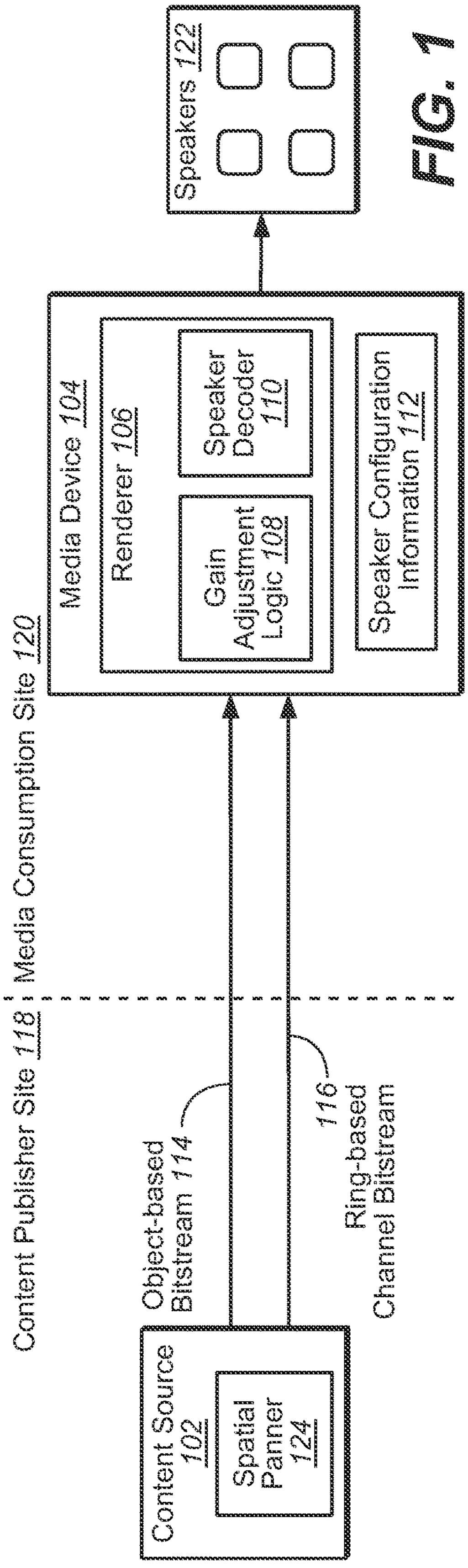
FIG. 1 illustrates an example media rendering system where the rendering logic is performed at a media consumption site.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1. General Overview
2. Structural and Functional Overview
3. Gain Adjustment for Audio in Object-Based Format
4. Gain Adjustment for Audio in Ring-Based Channel Format
5. Implementation Mechanisms—Hardware Overview 1. General Overview This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Sound content received or stored at a media device may be associated with audio information indicating an amount of signal associated with the sound content. The amount of signal may indicate how much signal should be sent to a set of speakers at a media consumption site to play the audio content. A renderer may be capable of applying a gain to the sound content before causing the sound content to be played through a set of connected speakers. As used in this context, "applying a gain" to sound content means changing the amount of signal for the sound content before causing it to be played at the set of connected speakers. A renderer may determine the amount of gain to sound content before causing it to be played at the set of connected speakers based on a gain value. In some embodiments, the gain value that is associated with content by default is one (1), indicating that the renderer should not alter the signal strength values associated with the sound content when obtained by the renderer before causing the sound content to be played at the set of speakers at a media consumption site.

According to some approaches described herein, the renderer may adjust the gain value associated with certain content based, at least in part, on audio information associated with the content and information about the positions of the speakers at the media consumption site. In some embodiments, the adjusted gain value associated with the certain content portion affects the amount of signal sent to the set of speakers. In some embodiments, the gain adjustment may be applied to the object-based content and not to any channel(s) in particular. The gain of the object-based content may be adjusted based on a determined gain adjustment value before the object-based content is decoded to determine the appropriate amount of audio signal to send to each speaker in a speaker configuration.

In some embodiments, a renderer receives audio information in the form of audio items comprising sound content portions and position metadata indicating a location in a virtual sound plane at which the sound content portion is intended to play A position corresponding to the sound content portions may be a position at which the sound content is to be played at a media consumption site. In some embodiments, the position of the sound content may vary by time and the position metadata may indicate the positions corresponding to the sound content at various times.

In some embodiments, audio information in an object-based format may be channel-independent. That is, the position metadata may not include any channel information that indicates how much signal should be sent to one or more channels of a plurality of channels. One benefit of delivering audio information in object-based format may be that the content producer need not provide different audio information for each of the potential channel configurations that could be used at the media consumption site, which may be necessary in an approach where the audio information is channel-based. The content producer may simply specify a position indicating where the sound should be originating from and the media device which receives the content may comprise a renderer capable of determining the appropriate amount of signal to be played by each speaker of a set of speakers.

A renderer may automatically determine a gain adjustment value for each content portion based on the position corresponding to the content portion and based on the number and positions of the speakers at a media consumption site.

Audio information may also be received in a ring-based channel format. The renderer may receive a ring-based channel signal specifications for each content portion specifying an amount of audio signal corresponding to each ring-based channel of a set of ring-based channels for the content portion. A renderer may automatically determine a gain adjustment value for each ring-based channel for the content portion based at least in part on the ring to which the ring-based channel belongs and based on the positions of the speakers at a media consumption site.

2. Structural and Functional Overview

FIG. 1 illustrates an example media rendering system where the rendering logic is performed at a media consumption site. Media device 104 may be any media device capable of receiving audio content in an object-based or ring-based channel format and providing the appropriate amount of signal to a set of speakers. For example, media device 104 may include, but is not limited to, any of: a set top box, personal computer, a video game console, home theater receiver/amplifier, commercial theater sound system, a portable computing device such as a mobile telephone or tablet, etc. Media device 104 is located at a media consumption site 120, such as a movie theater or a home. Media device 104 may receive audio information comprising audio content from content source 102 located at a content publisher site 118.

In some embodiments, content source 102 comprises a spatial panner 124 that is capable of obtaining audio information in a format other than a ring-based channel format, such as an object-based format, and converting the audio information into a ring-based channel format. For example, spatial panner 124 may determine the appropriate amount of audio signal to send through each channel of a set of ring-based channels to properly simulate the playing of certain audio content at the particular position indicated in the object-based audio information. After determining the appropriate amount of audio signal to be sent through each channel in the set of ring-based channels for a particular content portion, spatial panner 124 may send a ring-based channel signal specification specifying an amount of audio signal for each of the ring-based channels to media device 104. Ring-based channel bitstream 116 may contain the ring-based channel signal specification.

Renderer 106 may determine an amount of audio signal to be played at each speaker of speakers 122 based on speaker configuration information 112 and the audio information received from content source 102. The audio information received by renderer 106 may be in object-based format or ring-based channel format, or both. For example, renderer 106 may concurrently receive an object-based bitstream 114 and ring-based channel bitstream 116, both containing content to be played at speakers 122.

Speaker configuration information 112 may indicate the number of speakers connected to media device 104 and the position of each speaker connected to media device 104. Speaker configuration information 112 may be stored at media device 104 or at a separate location accessible to media device 104 and may be updated periodically or automatically each time a speaker is disconnected or has its location or position changed.

Renderer 106 at media device 104 may adjust the gain of the received audio content based on audio information associated with the received audio content and speaker configuration 112. Speaker configuration 112 may indicate the position of the speakers at media consumption site 120.

Speaker decoder 110 may comprise logic for determining the appropriate amount of audio signal to send to each speaker of speakers 122 to play the received audio content at speakers 122. The amount of audio signal sent to each speaker for a content portion may be based on a gain value associated with the content portion. In some embodiments, the logic of speaker decoder 110 is performed after gain adjustment logic 108 so that the audio content is played at speakers 122 according to the adjusted gain level.

Figure 2:
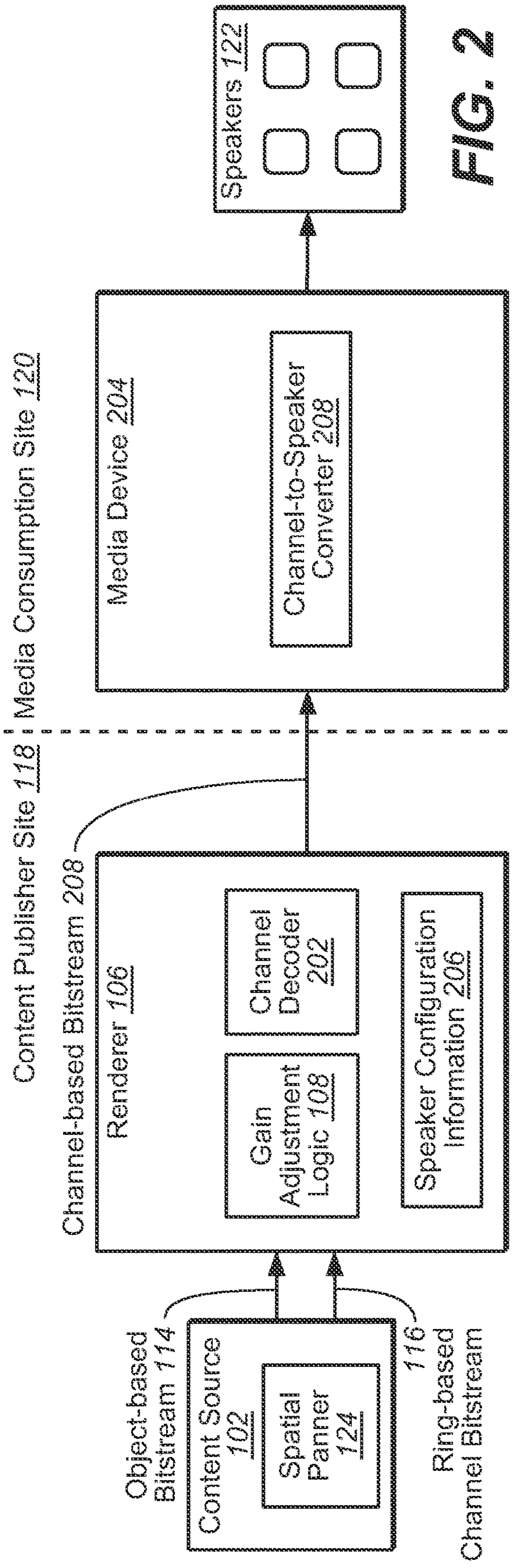
FIG. 2 illustrates an example media rendering system where the rendering logic is performed at a content publisher site.

FIG. 2 illustrates an example media rendering system where the rendering logic is performed at a content publisher site 118. In some embodiments, gain adjustment logic 108 is performed by renderer 106 at a site located remote to the media consumption site 120, such as at the content publisher site 118. Renderer 106 may receive audio information in the object-based format and/or the ring-based channel format, as represented by object-based bitstream 114 and ring-based channel bitstream 116. Renderer 106 may adjust the gain of the incoming audio.

Channel decoder 202 at renderer 106 may convert the incoming audio to a different format that is supported by media device 204. For example, media device 204 may not comprise the software or hardware to render audio received in an object-based format or ring-based channel format. Channel decoder 202 may convert audio information from an object-based format or ring-based channel format to a channel-based format that is supported by media device 204. Channel-based bit stream 208 may represent the audio information sent to media device 204 after conversion.

The gain adjustment may be determined based on speaker configuration information 206. Speaker configuration information 206 may indicate the positioning of speakers 122 at media consumption site 120. For example, media device 204 may provide speaker configuration information to renderer 106. In other embodiments, speaker configuration information 206 may specify assumed positions of speakers 122. For example, certain channel-based formats may be associated with a certain configuration of speakers and speakers 122 may be assumed to be positioned according to a configuration associated with a certain channel-based format.

Media device 204 is located at media consumption site 120 and may be a device that comprises a channel-to-speaker converter 208, such as an amplifier. Channel-to-speaker converter 208 may determine the amount of signal to send to each of speakers 122 based on the audio information received from renderer 106 in channel-based bitstream 208.

One benefit of the system illustrated in FIG. 2 is that, by adjusting the gain at a content publisher site or some other site remote to the media consumption site, gain may be adjusted according to gain adjustment logic 108 even in systems where media device 204 does not have the proper hardware or software to implement renderer 106 or to perform gain adjustment logic 108.

The embodiments discussed herein could be implemented in any combination of the systems illustrated in FIG. 1 and FIG. 2, or in an altogether different system. For example, in some embodiments, the logic of renderer 106 may be performed at content source 102 for a first set of media devices that do not have the appropriate software or hardware to implement renderer 106. For the first set of media devices, content source 102 may send the audio information to media device of the first set in a channel-based format after rendering. The same content source 102 may also send content to a second set of media devices that do possess the appropriate software and hardware to implement renderer 106. For the second set of media devices, content source 102 may send audio information in an object-based or ring-based channel format to the media devices and the logic of renderer 106 may instead be performed at the second set of media devices.

3. Gain Adjustment for Audio in Object-Based Format

Figure 3:
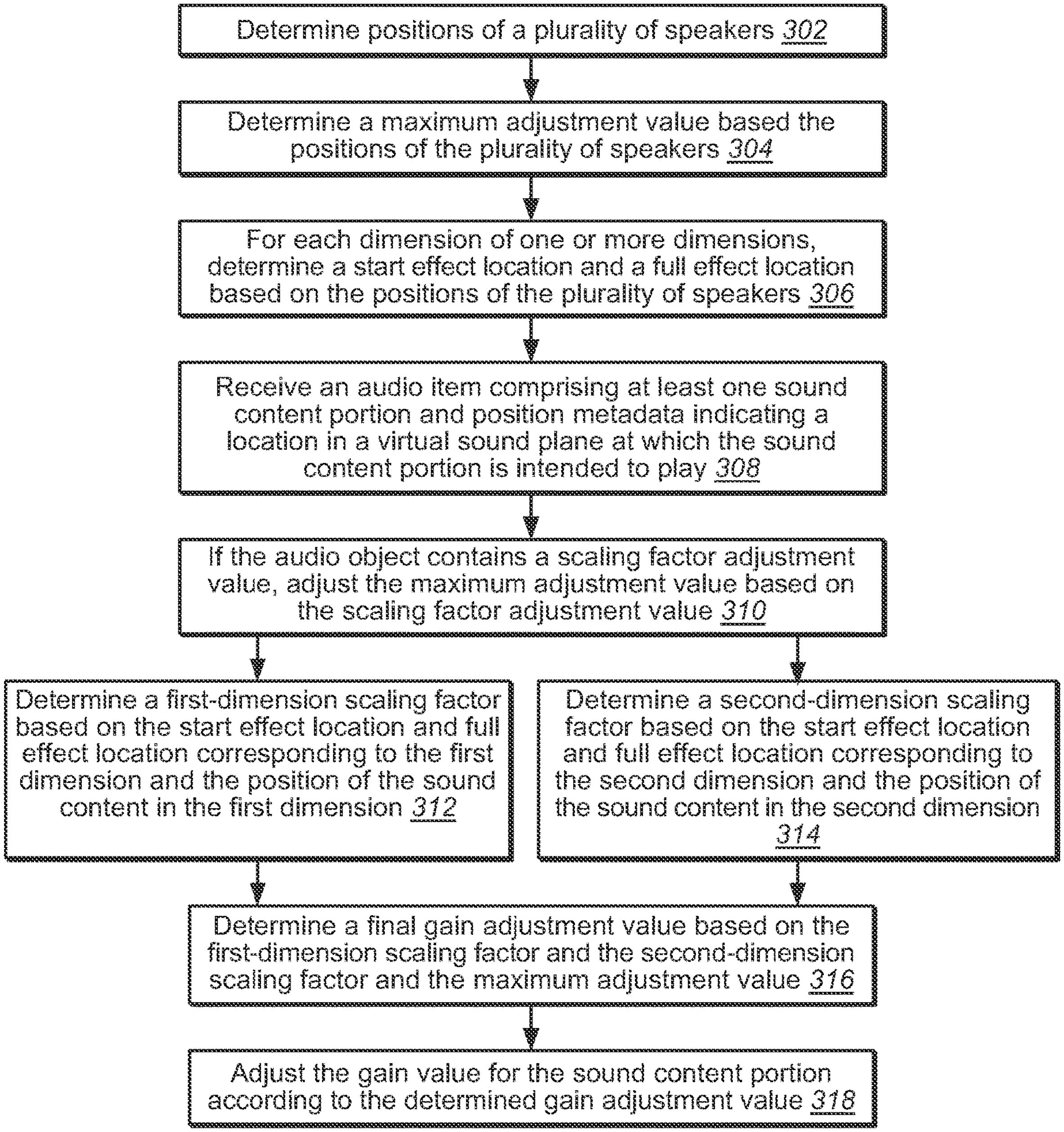
FIG. 3 illustrates an example process for determining a gain adjustment value for audio content based on object-based metadata associated with the audio content and the positions of a plurality of speakers at a media consumption site.

FIG. 3 illustrates an example process for determining a gain adjustment value for audio content based on object-based metadata associated with the audio content and the positions of a plurality of speakers at a media consumption site. The process illustrated in FIG. 3 may be performed at renderer 106.

At block 302, renderer 106 determines the positions of a plurality of speakers. The speaker position information may be retrieved from speaker configuration information 112 or 206. The plurality of speakers may include all of the speakers known or assumed to be connected to media device 204 or 104.

In some embodiments, a position of a speaker is indicated relative to a point or area at which a listener is expected to be located. In other embodiments, a position of a speaker is indicated relative to other locations, such as the location of a screen or projection area upon which image or video content accompanying the audio content may be displayed.

At block 304, renderer 106 determines a maximum adjustment value for content to be played at the plurality of speakers based on the positions of the plurality of speakers.

In an embodiment, each speaker of the plurality of speakers is categorized into a position category. For example, all speakers located more than three feet higher than a particular location in the Z dimension may be categorized as belonging to the position category of "elevation speakers." All speakers located more than a particular amount behind a particular location in the Y dimension may be categorized as belonging to the position category of "rear surround speakers." All speakers located less than a particular amount behind a particular location in the Y dimension and more than a particular amount to the left of a particular location in the X dimension categorized as belonging to the position category of "left surround speakers."

Figure 7:
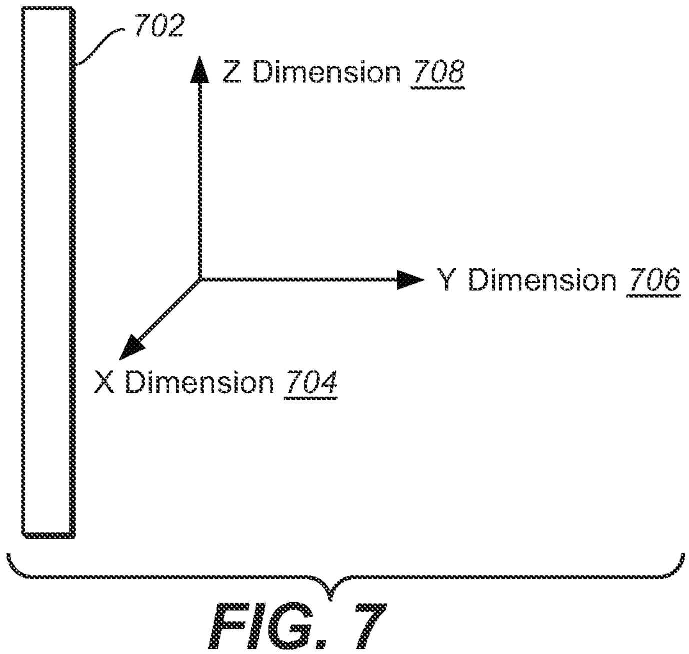
FIG. 7 illustrates an example classification of dimensions according to one embodiment.

FIG. 7 illustrates an example classification of dimensions according to one embodiment. Screen 702 may represents a screen at which the visual media is displayed at the media consumption site. An object's location value corresponding to the X dimension 704 may indicate the amount of distance to the left or right of the center point of screen 702 at which the object is located. An object's location value corresponding to the Y dimension 706 may indicate the amount of distance behind screen 702 at which the object is located. An object's location value corresponding to the Z dimension 704 may indicate the amount of distance upwards or downward from a particular location at which the object is located. The particular location may be the expected-ear-level of the listener.

The maximum adjustment value may be determined based on the number of speakers in a set of one or more location categories. For example, if there are no speakers in the position category of "left surround speakers" and "right surround speakers" and no speakers in the position category of "elevation speakers," a maximum adjustment value of −4.5 decibels (dB) may be selected for sound content to be played at the plurality of speakers. As another example, if there are greater than four speakers in the position categories of "left surround speakers" and "right surround speakers" but no speakers in the position category of "elevation speakers," a lower maximum adjustment value of negative three (−3) dB may be selected. In some embodiments, the maximum adjustment value may be 0 if there is at least a certain threshold amount of speakers in each position category. A maximum adjustment value of 0 dB may indicate that there should be no adjustment regardless of the position of a sound content portion.

In another embodiment, the maximum adjustment value may be determined by determining a first number of speakers in a top region, a second number of speakers in a lower region, and further based on a stored stereo adjustment value and a no-height adjustment value. In on embodiment, the speakers in the top region include all speakers that are located above a certain level, such as the expected ear-level of the listener. The speakers in the lower region may include all speakers that are both located below a certain height, such as the expected ear-level of the listener and that are located at least some distance away from the screen. In other embodiments, the boundaries of the top and lower region may be defined differently.

The stereo adjustment value and a no-height adjustment value may not be content-specific or configuration-specific. That is, the stereo adjustment value and the no-height adjustment value may not change based on the configuration of speakers or the position associated with any particular content. A stereo adjustment value may represent the maximum adjustment value to be applied for a stereo-only speaker configuration. A stereo-only speaker configuration is a configuration where there are no speakers more than a particular distance away from the screen. A no-height adjustment value may represent the maximum adjustment value to be applied for a configuration that includes one or more speakers at least a particular distance behind the expected location of the listener, and to the right and left of the expected location of the listener, but with no speakers located above a particular level, such as the expected ear-level of the listener.

To determine the maximum adjustment value, a maximum adjustment value corresponding to the lower region (maxAdjLow) and a maximum top adjustment value (maxAdjTop) corresponding to the top region may be determined. The maximum adjustment value corresponding to the lower region may be determined based on the stereo adjustment value (stereoAdj), the no-height adjustment value (noHeightAdj) and the number of speakers in the lower region (nLow) by evaluating Equation 1. The maximum adjustment value corresponding to the top region may be determined based on the stereo adjustment value (stereoAdj), the no-height adjustment value (noHeightAdj), and the number of speakers in the top region by evaluating Equation 2.

$$\text{maxAdjLow}=(\text{noHeightAdj}-\text{stereoAdj})*\min(\text{nLow}/4,1). \quad \text{Equation 1:}$$

$$\text{maxAdjTop}=-\text{noHeightAdj}*\min(\text{nTop}/4,1) \quad \text{Equation 2:}$$

$$V=-\text{stereoAdj}-\text{maxAdjLow}-\text{maxAdjTop} \quad \text{Equation 3:}$$

The maximum adjustment value (maxAdjValue) may be determined by evaluating Equation 3 to determine value V. As illustrated in Equation 4 below, the maximum adjustment value may be the value V if the value is less than 0. If the value V is greater than 0, the maximum adjustment value may be 0 indicating that there should not be any adjustment to the gain.

$$\text{maxAdjValue}=\min(0,V) \quad \text{Equation 4:}$$

The maximum adjustment value may be determined based on the speaker configuration in different ways according to different embodiments.

At block 306, renderer 106 determines, for each dimension of one or more dimensions, a start effect location and a full effect location based on the positions of the plurality of speakers. If the position corresponding to a sound content portion is located before the start effect location in a particular dimension, there may not be any gain adjustment based on the position's location in the particular dimension. All positions located on or after the full effect location in a particular dimension may be associated with the same maximum gain adjustment amount associated with the particular dimension. For example, a start effect location corresponding to the Y dimension may be 0.2 and the full effect location corresponding to the Y dimension may be 0.9. Any sound content portion being located past location 0.9 in the Y dimension may receive the same amount of gain adjustment based on its location in the Y dimension. Any sound content portion whose position is located before location 0.2 in the Y dimension may not receive a gain adjustment based on its position in the Y dimension.

At block 308, renderer 106 receives an audio item comprising at least one sound content portion and position metadata indicating a location in a virtual sound plane at which the sound content portion is intended to play. For example, an audio item received by renderer 106 may include a particular content portion and position metadata indicating that the particular content portion is to be played at a location of {0, 6, 8} relative to a particular location in the virtual sound plane, such as the location at which a listener is expected to be located. The audio item may comprise a plurality of sound content portions and different metadata items corresponding to each of the sound content portions, where the position metadata items indicates different location for each of the sound content portions.

The audio item may be one of a plurality of audio items received at media device 104 or media device 204. Media device 104 may receive different sound content portion belonging to the same mix, and the amount of gain adjustment applied to the different sound content portions of the same mix may be different. A mix may comprise different sound content portions, which each correspond to different positions but are associated with the same time. The different sound content portions may be included in the same audio items or different audio items. The different sound content portions may be intended to be played at the same time concurrently with the display of associated visual media. For example, a first sound content portion may comprise the soundtrack component of a movie and a second sound content portion may comprise the dialog portion of the movie. The first sound content portion may be associated with a different position than the second sound content portion and, as a result, may be assigned a different gain adjustment value.

In some embodiment, an audio item may comprise metadata indicating a scaling factor adjustment value. At block 310, if the received audio item contains a scaling factor adjustment value, renderer 106 adjusts the maximum gain adjustment value based on the scaling factor adjustment values. For example, a content producer may realize that due to the position corresponding to particular content, a gain that reduces the signal associated with the particular content is likely to be applied by renderer 106 before the content is sent to the speakers if the number of speakers is small. The particular content may comprise sound that the producer considers important, such as sound relating to dialog or action occurring on the screen. In such a situation, the content producer may wish to override the behavior of renderer 106. The content producer may do so by specifying a scaling factor adjustment value of 0.5. A scaling factor adjustment value of 0.5 may cause renderer 106 to reduce the maximum amount of gain adjustment that may be applied by limiting the maximum adjustment values to half of what would otherwise have been the maximum adjustment value.

At block 312, renderer 106 determines a first-dimension scaling factor based on the start effect location and full effect location corresponding to the first dimension and the position of the sound content in the first dimension of the virtual sound plane. In an embodiment, a first-dimension scaling factor is determined according to Equation 5.

$$gY=\text{clamp}((\text{pos}(Y)-\text{startEffectY})/(\text{fullEffectY}-\text{startEffectY})) \quad \text{Equation 5:}$$

In Equation 5, g(Y) represents the first-dimension scaling factor, pos(y) represents the position of the sound content portion in the Y dimension, startEffectY represents the start effect location associated with the Y dimension, fullEffect Y represents the full effect location associated with the Y dimension.

Clamp( ) is a function that causes the first-dimension scaling factor, g(Y), to be a value between 0 and 1 by setting g(Y) to 0 if the expression (pos(Y)−startEffectY)/(fullEffectY−startEffectY) is less than 0 and setting g(Y) to 1 if the expression (pos(Y)−startEffectY)/(fullEffectY−startEffectY) is greater than 1.

In some embodiments, position values, such as pos(Y) may be normalized to be a value between 0 and 1 or between −1 and 1 before computing the result of Equation 5.

Equation 5 illustrates merely one example method for determining a first-dimension scaling factor; other embodiments may determine the first-dimension scaling factor in other ways.

At block 314, renderer 106 determines a second-dimension scaling factor based on the start effect location and full effect location corresponding to the second dimension and the position of the sound content in the second dimension of the virtual sound plane. The second dimension may be the Z dimension or the X dimension. The expression for calculating scaling factor may be the same or different for different dimensions. In some embodiments, a dimension scaling factor may be calculated for each of the X, Y, and Z dimensions. In other embodiments, dimension scaling factor may only be calculated for the Y and Z dimensions.

At block 316, renderer 106 determines a final gain adjustment value based on the first-dimension scaling factor and the second-dimension scaling factor and the maximum adjustment value. In an embodiment, the final gain adjustment value is determined by adding together the first-dimension scaling factor and the second-dimension scaling factor and normalizing the result to be between 0 and 1 by replacing the sum with 1 if it is greater than 1. The resulting summed scaling factor may be used to scale the maximum adjustment value. In an embodiment, the final gain adjustment value is determined according to Equation 6.

$$\text{determinedAdj}=-\text{maxAdj}*\text{clamp}(gY+gZ) \quad \text{Equation 6:}$$

In Equation 6, determinedAdj represents the final gain adjustment value, maxAdj represents the maximum adjustment value, gY represents the first-dimension scaling factor, and gZ represents the second-dimension scaling factor. The final gain adjustment value may be a decibel value.

At block 318, renderer 106 adjusts the gain value for the sound content portion according to the determined gain adjustment value. In some embodiments, adjusting the gain may comprise multiplying the original gain value by the final gain adjustment value. For example, if the final gain adjustment value is 0.6 and the original gain value is 1, the gain may be lowered to the adjusted gain value of 0.6.

In some embodiments, the adjusted gain value associated with the certain content portion affects the amount of signal sent to speakers 122 if the rendering logic is performed at media device 104 or to media device 104 if the rendering logic is performed at renderer 106 in FIG. 2. For example, if the adjusted gain value corresponding to a particular content portion is 0.6 voltage gain, renderer 106 may send only sixty (60) percent of the amount of signal originally associated with the particular content portion when received by renderer 106. The amount of signal originally associated with the particular content portions may be indicated in object-based bitstream 114 or ring-based channel bitstream 116 received at media device 104. The adjusted amount of signal associated with the particular content portions may be indicated in channel-based bitstream 208 in FIG. 2 or the signals sent to speakers 122 in FIG. 1.

In the system illustrated in FIG. 1, after the adjustment of the gain value, speaker decoder 110 may determine the amount of signal to send to each speaker of speakers 122. In the system illustrated in FIG. 2, channel decoder 202 may determine the amount of signal to associate with each channel of a set of channels.

In the process of FIG. 3, the maximum adjustment value and the start effect location and the full effect location for each of the dimensions may be a function of the positions of speakers 122. The steps of blocks 304 and 306 may be performed each time renderer 106 learns of a speaker configuration change, such as when a speaker is disconnected or moved.

The first-dimension scaling factor and second-dimension scaling factor may be determined based in part on the position of a content portion. The steps of blocks 312-318 may be repeated for each content portion to determine the gain adjustment value applicable to the content portion.

Figure 4:
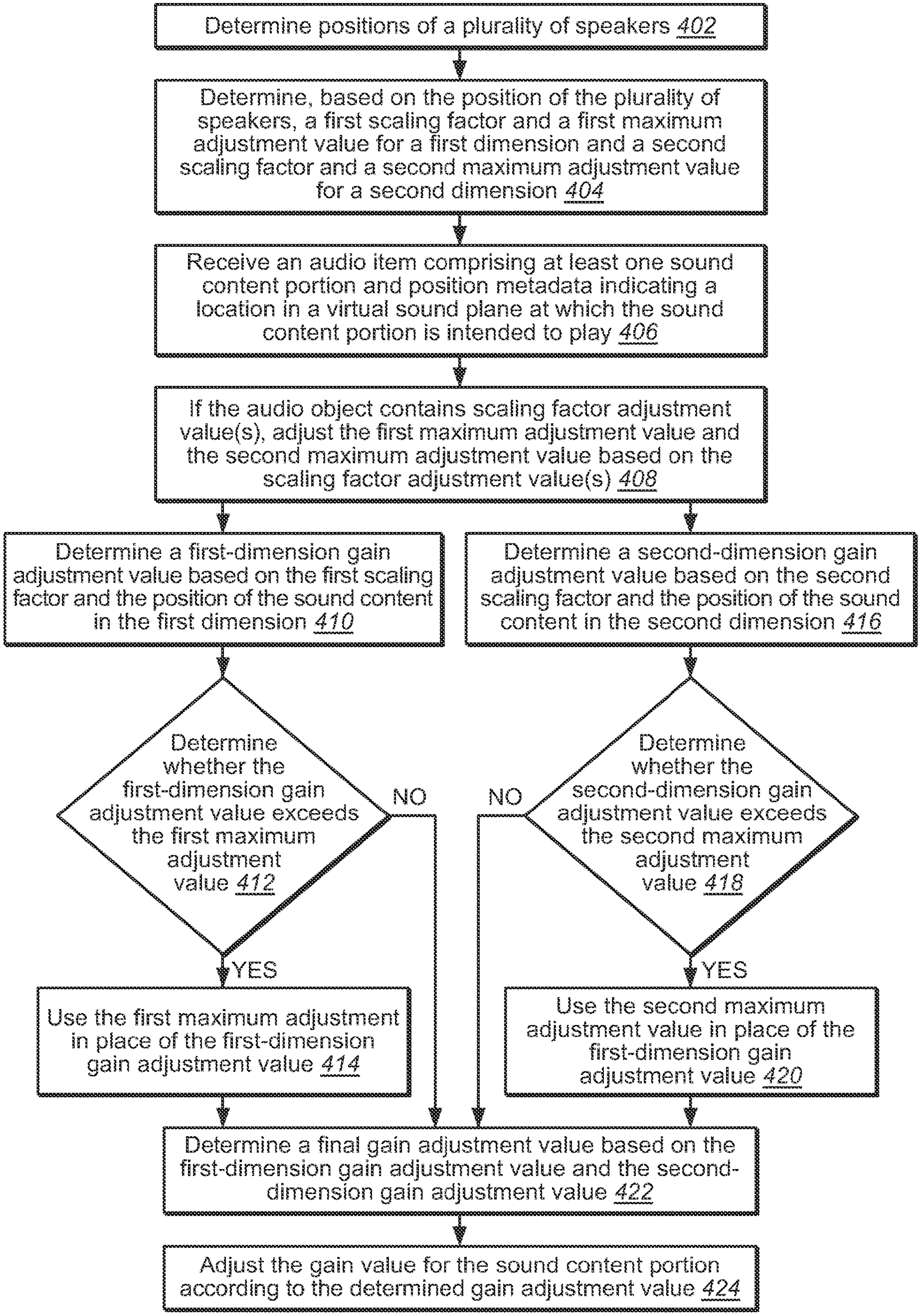
FIG. 4 illustrates another example process for determining a gain adjustment value for audio content based on object-based metadata associated with the audio content and the positions of a plurality of speakers at the media consumption site.

FIG. 4 illustrates another example process for determining a gain adjustment value for audio content based on object-based metadata associated with the audio content and the positions of a plurality of speakers at the media consumption site. The process illustrated in FIG. 4 may be performed at renderer 106.

At block 402, renderer 106 determines the positions of a plurality of speakers. At block 404, renderer 106 determines, based on the positions of the plurality of speakers, a first scaling factor and a first maximum adjustment value for a first dimension and a second scaling factor and a second maximum adjustment value for a second dimension.

For example, a first scaling factor and a first maximum adjustment value may correspond to the y-dimension. A location value corresponding to the y-dimension may indicate the amount of distance forward or backward from a particular location in the y-dimension, such as the expected location of a listener. A second scaling factor and a second maximum adjustment value may correspond to the z-dimension. A location value corresponding to the z-dimension may indicate the amount of distance upwards or downwards from a particular location, such as the expected ear-level of the listener. In some embodiments, there may also be a third scaling factor and a third maximum adjustment value corresponding to an x-dimension. A location value corresponding to the x-dimension may indicate the amount of distance to the right or to the left of a particular location, such as the middle of the screen.

In an embodiment, each speaker of the plurality of speakers is categorized into a position category based on the position of the speaker. The first scaling factor and the first maximum adjustment value corresponding to a first dimension may be determined based on the number of speakers in a first set of one or more position categories and the second scaling factor and the second maximum adjustment value corresponding to a second dimension may be determined based on the number of speakers in a different set of one or more position categories.

For example, the first scaling factor and the first maximum adjustment value corresponding to the Z-dimension may be determined based on the number of speakers belonging to the position category of "elevation speakers." If there are no speakers belonging to the position category of "elevation speakers," the first scaling factor corresponding to the Z-dimension may be negative three (−3), indicating that the gain is to be reduced by three (3) decibels, and the corresponding first maximum adjustment value may be negative three (−3). In some embodiments, the maximum adjustment values may be different than the scaling factors. If there are between three (3) and six (6) speakers belonging to the position category of "elevation speakers," the first scaling factor corresponding to the Z-dimension may be −1.5 and the corresponding first maximum adjustment value may be −1.5. If there are more than six (6) speakers belonging to the position category of "elevation speakers," the first scaling factor corresponding to the Z-dimension may be zero (0) and the corresponding first maximum adjustment value may be zero (0), indicating that the gain is not to be changed.

The second scaling factor and the second maximum adjustment value corresponding to the Y-dimension may be based on the number of speakers belonging to the position category of "rear surround speakers."

In other embodiments, a single adjustment value may be determined rather than a separate adjustment value for each dimension. For example, based on a determination that there are no speakers assigned to the position category of "elevation speakers" and there are three (3) speakers assigned the position category of "rear surround speakers," renderer 106 may determine an adjustment value of −1.5, which does not correspond to any specific dimension.

At block 406, renderer 106 receives an audio item comprising at least one sound content portion and position metadata indicating a location in a virtual sound plane at which the sound content portion is intended to play. The audio item may be one of a plurality of audio items received at media device 104 or media device 204.

In some embodiments, an audio item may comprise metadata indicating a scaling factor adjustment value. At block 408, if the received audio item contains scaling factor adjustment value(s), renderer 106 adjusts the first maximum adjustment value and the second maximum adjustment value based on the scaling factor adjustment value(s). In some embodiments, the audio metadata may specify two or three scaling factor adjustment values, where each scaling factor adjustment value corresponds to a particular dimension and the maximum adjustment corresponding to each dimension may be scaled according to the corresponding scaling factor adjustment value. In other embodiments, the audio metadata may specify a single scaling factor adjustment value, which corresponds to all dimensions and the maximum adjustment value corresponding to each dimension may be scaled according to the single scaling factor adjustment value.

At block 410, renderer 106 determines a first-dimension gain adjustment value based on the first scaling factor and the position of the sound content in the first dimension. In one embodiment, the first-dimension gain adjustment value may be determined by multiplying the position of the sound content in the first dimension by the first scaling factor. The positions may be normalized to be a number between 0 and 1 before multiplication. For example, if the position of the sound content is {0.5, 0.1, 0.2} and the first scaling factor is 0.6, the first-dimension gain adjustment value may be determined to be 0.3 by multiplying together 0.5, the position of the sound content in the first dimension, and 0.6. Other embodiments may determine the first-dimension gain adjustment value in other ways.

At block 416, renderer 106 determines a second-dimension gain adjustment value based on the second scaling factor and the position of the sound content in the second dimension, which may be determined using a similar approach as described in relation to block 410.

At block 412, renderer 106 determines whether the first-dimension gain adjustment value exceeds the first maximum gain adjustment value. If the first-dimension gain adjustment value exceeds the first maximum adjustment value, the process proceeds to block 414 and renderer 106 uses the first maximum adjustment value as the first-dimension gain adjustment value. In an embodiment where the maximum adjustment value and the dimension gain adjustment values are both negative numbers, the dimension gain adjustment value may be considered as exceeding the maximum adjustment value if the absolute value of the dimension gain adjustment values is greater than the absolute value of the maximum adjustment value.

For example, the maximum gain adjustment value for the first dimension may be negative two (−2). The first-dimension gain adjustment value may be determined to be negative five (−5). In such a case, the maximum gain adjustment value of negative two (−2) may be considered as exceeding the maximum gain adjustment value of negative five (−5), and the maximum gain adjustment value of negative five (−5) may be used in place of the first-dimension gain adjustment value during the step of determining a final gain adjustment value depicted in block 422. Otherwise the process proceeds to block 322 without the replacing the first-dimension gain adjustment value with the maximum gain adjustment value.

At block 418, renderer 106 determines whether the second-dimension gain adjustment value exceeds the second maximum adjustment value. If the second-dimension gain adjustment value exceeds the second maximum adjustment value, the process proceeds to block 420 and renderer 106 uses the second maximum adjustment value as the second-dimension gain adjustment value. Otherwise the process proceeds to block 422 without the replacing the first-dimension gain adjustment value with the maximum gain adjustment value.

At block 422, renderer 106 determines a final gain adjustment value based on the first-dimension gain adjustment value and the second-dimension gain adjustment value. The first-dimension gain adjustment value and the second-dimension gain adjustment value may be combined in different ways according to different embodiments. In one embodiment, the first-dimension gain adjustment value and the second-dimension gain adjustment value are first each converted from decibel values to voltage gain amounts and then multiplied together.

For example, a first-dimension gain adjustment value of negative three (−3) and a second-dimension gain adjustment value of negative two (−2) may be converted to voltage gain amounts of 0.71 and 0.79 respectively before being multiplied together.

At block 424, renderer 106 adjusts the gain value for the sound content portion according to the determined gain adjustment value.

In the process of FIG. 4, the scaling factors and maximum adjustment values may be a function of the positions of speakers 122. The steps of blocks 402 and 404 may be performed each time speaker configuration information 112 or 206 changes, such as when a speaker is disconnected or moved. The steps of blocks 406-424 may be repeated for each content portion to determine the gain adjustment value applicable to the content portion.

4. Gain Adjustment for Audio in Ring-Based Channel Format

Figure 5:
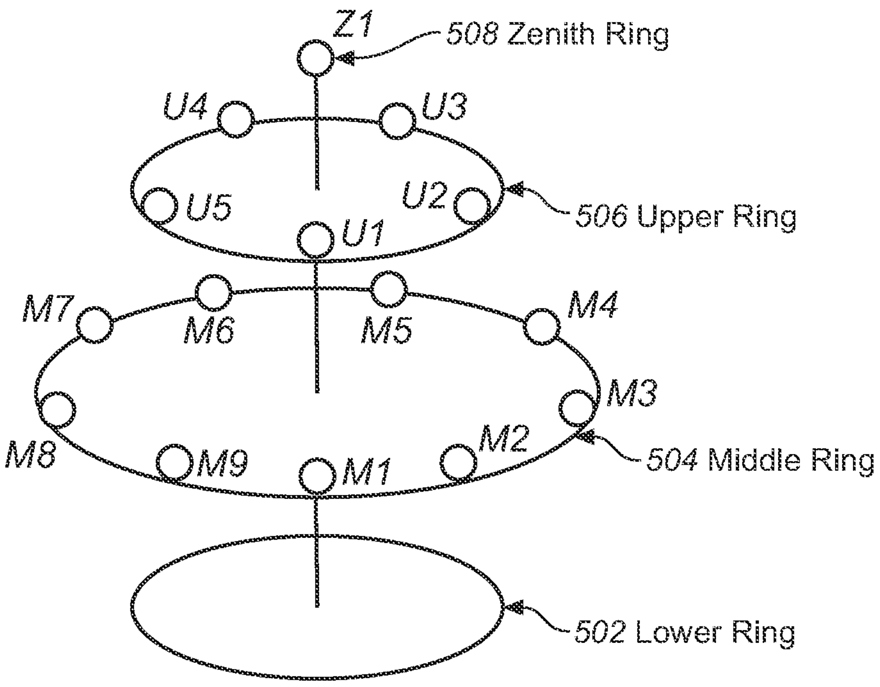
FIG. 5 illustrates the positions of a plurality of example ring-based channels.

FIG. 5 illustrates the positions of a plurality of example ring-based channels. Each ring-based channel of a set of ring-based channels may correspond to a position on an imaginary ring around an imaginary point, which may correspond to a location at which a listener at an arbitrary media consumption site is expected to be located.

Positions Z1, U1-U4, M1-M9 may each represent the position of a channel of a set of ring-based channels. The ring-based channels may correspond to positions on any of four imaginary rings, Lower Ring 502, Middle Ring 504, Upper Ring 506, or Zenith Ring 508. Other embodiments may include more or less rings a more or less positions on the rings.

In some embodiments, spatial panner 124 at content source 102 receives audio information in a format different from the ring-based channel format, such as an object-based format, and converts the audio information to a ring-based channel format. Specifically, based on the position metadata associated with a content portion and mappings of channels to rings and positions upon rings, spatial panner 124 may determine the amount of signal to assign to each channel of the set of channels corresponding to Positions Z1, U1-U4, M1-M9 for the content portion. For example, when the format of a content portion that corresponds to a position located high in the Z dimension is converted from object-based to a ring-based channel format, there may be a high signal value associated with the channels located on Upper Ring 506 or Zenith Ring 508.

The channels whose positions are illustrated in FIG. 5 may not correspond to a positioning of speakers at any media consumption site. The ring-based channel format may be an intermediary format intended to be subsequently used, in some cases at the media consumption site, for determining the appropriate amount of audio signal to direct to each speaker available at a media consumption site.

Figure 6:
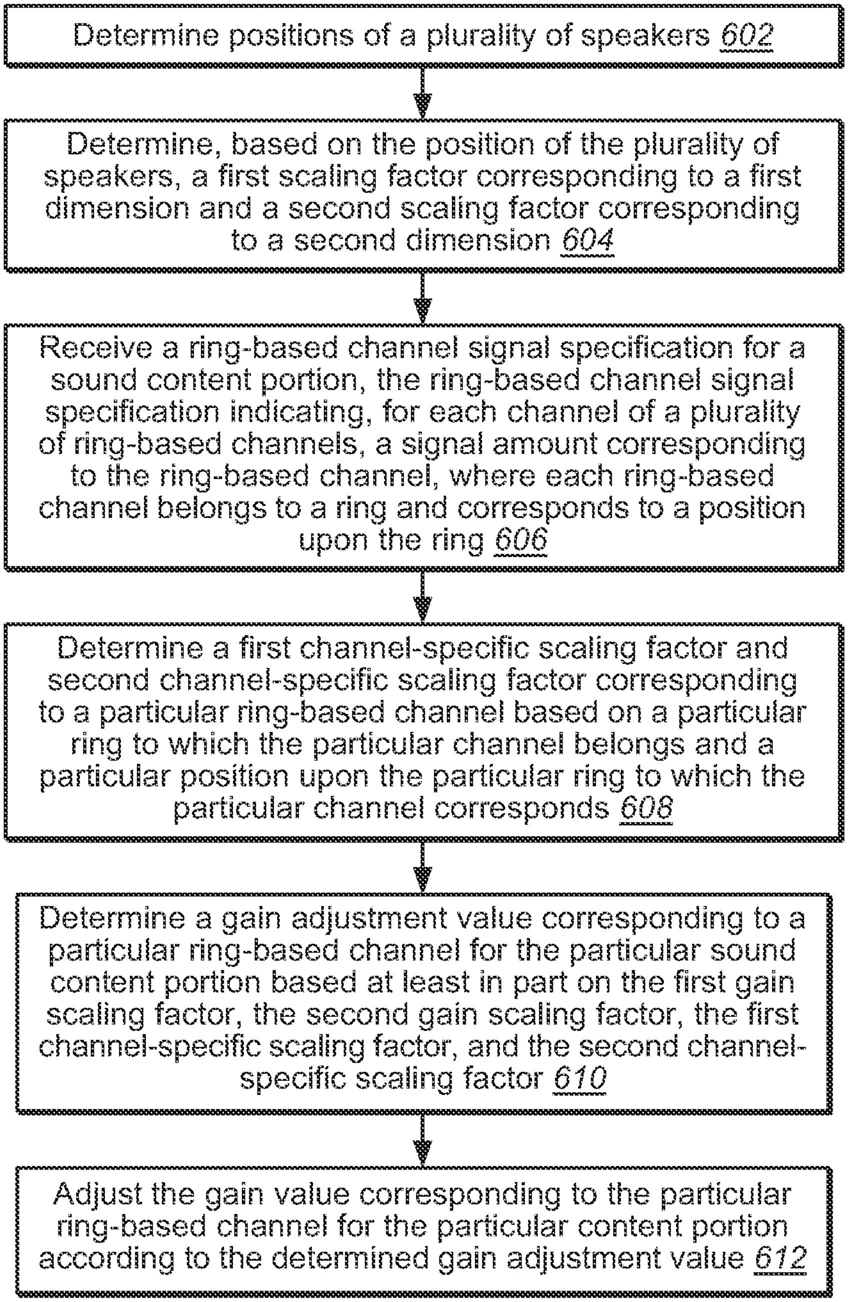
FIG. 6 illustrates an example process for determining a gain adjustment value for audio content based on ring-based channel information associated with the audio content and the positions of a plurality of speakers at a media consumption site.

FIG. 6 illustrates an example process for determining a gain adjustment value for audio content based on ring-based channel information associated with the audio content and the positions of a plurality of speakers at a media consumption site. The process illustrated in FIG. 6 may be performed at renderer 106.

At block 602, renderer 106 determines positions of a plurality of speakers. At block 604, renderer 106 determines, based on the position of the plurality of speakers, a first scaling factor for a first dimension and a second scaling factor for a second dimension. The scaling factors may be determined according to the approaches described with respect to block 404 of FIG. 4.

At block 606, renderer 106 receives a ring-based channel signal specification for a sound content portion, the ring-based channel signal specification indicating, for each channel of a plurality of ring-based channels, a signal amount corresponding to the ring-based channel, where each ring-based channel belonging to a ring and corresponds to a position upon the ring. For example, a certain ring-based channel signal specification may indicate, in part, that for a particular content portion, 10 decibels of signal is to be played at a first channel, where the first channel corresponds to a location at an angular rotation of seventy-two (72) degrees from a particular position on Upper Ring 506, and two (2) decibels of signal is to be played at a second channel, where the second channel corresponds to a location at an angular rotation of 144 degrees from a particular position on Upper Ring 506, and so forth for each of a number of channels.

A ring-based channel signal specification may adhere to a particular format. For example, each ring-based channel signal specification received by a media device 104 may contain fifteen (15) values, where each value corresponds to a ring and a position upon the ring. For example, the first value of the fifteen (15) values may indicate the amount of signal corresponding to a channel associated with a position upon the Middle Ring at an angular rotation of zero (0) degrees from a particular position of the Middle Ring, the second value may indicate the amount of signal corresponding to a channel associated with a position upon the Middle Ring at an angular rotation of seventy-two (72) degrees from the particular position of the Middle Ring. Renderer 106 may determine a channel to which a signal value corresponds based on the ordering of the signal values in the ring-based channel signal specification. Renderer 106 may further determine which ring and position upon the ring to which the channel corresponds based on mappings of channels to rings and ring positions, which may be stored locally or elsewhere.

At block 608, renderer 106 determines a first channel-specific scaling factor and second channel-specific scaling factor corresponding to a particular ring-based channel based on a particular ring to which the particular channel belongs and a particular position upon the particular ring to which the particular channel corresponds.

The first-channel specific scaling factor may correspond to a first dimension and the second-channel specific scaling factor may correspond to a second dimension. A first channel-specific scaling factor may indicate an amount by which the first gain scaling factor is to be scaled and a second channel-specific scaling factor may indicate an amount by which the second gain scaling factor is to be scaled.

In one embodiment, the first channel-specific scaling factor and the second channel-specific scaling factor corresponding to the particular ring-based channel may be determined by accessing a scaling factor repository. The scaling factory repository may indicate a first channel-specific scaling factor and a second channel-specific scaling factor for each of the channels. For example, the scaling factor repository may indicate a first-channel specific scaling factor of one (1) and a second-channel specific scaling factor of zero (0) for any particular ring-based channel belonging to the Upper Ring 506, Lower Ring 502, or Zenith Ring 508. In such an embodiment, the first-channel specific scaling factor may correspond to the Z dimension.

The scaling factor repository may further indicate a first-channel specific scaling factor of zero (0) for all channels belonging to Middle Ring 504. The scaling factor repository may indicate a second-channel specific scaling factor of one (1) for any particular ring-based channel belonging to Middle Ring 504 and being located at an angular rotation of more than 120 degrees from a particular position on the Middle Ring and less than 240 degrees from the particular position and a second-channel specific scaling factor of 0.5 for any particular ring-based channel belonging to Middle Ring 504 and being located at an angular rotation of approximately 90 degrees from a particular position on the Middle Ring or approximately 270 degrees from the particular position. For all remaining channels belonging to Middle Ring 504 and being located at any other location on Middle Ring 504, the second-channel specific scaling factor may be zero (0).

At block 610, renderer 106 determines a gain adjustment value corresponding to a particular ring-based channel for the particular sound content portion based at least in part on the first gain scaling factor, the second gain scaling factor, the first channel-specific scaling factor, and the second channel-specific scaling factor. A separate gain adjustment value may be determined for each ring-based channel. In one embodiment, the gain adjustment value corresponding to a particular channel may be determined according to Equation 3.

$$\text{GainAdjVal}(X)=\text{FirstScal}(X)*\text{FirstChanScal}(X)+\text{SecScal}(x)*\text{SecChanScal}(X) \quad \text{Equation 3:}$$

In Equation 3, GainAdjVal(X) represents the gain adjustment value corresponding to channel X, FirstScal(X) represents the first scale value, SecScal(x) represents the second scale value, FirstChanScal(X) represents the first channel-specific scaling factor, and SecChanScal(X) represents the second channel-specific scaling factor.

In another embodiment, there may be a scaling factor and channel-specific scaling factor determined for all three dimensions rather than just two dimensions.

At block 612, renderer 106 adjusts the gain value corresponding to the particular ring-based channel for the particular content portion according to the determined gain adjustment value. The gain values corresponding to the other ring-based channels identified in the ring-based channel signal specification may also be adjusted according to their corresponding gain adjustment values.

According to various embodiments, one or more of the steps of the processes illustrated in FIGS. 3, 4, and 6 may be removed or the ordering of the steps may be changed. Additionally, although separate embodiments are discussed herein, any combination of embodiments and/or partial embodiments discussed herein may be combined to form further embodiments.

5. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

Figure 8:
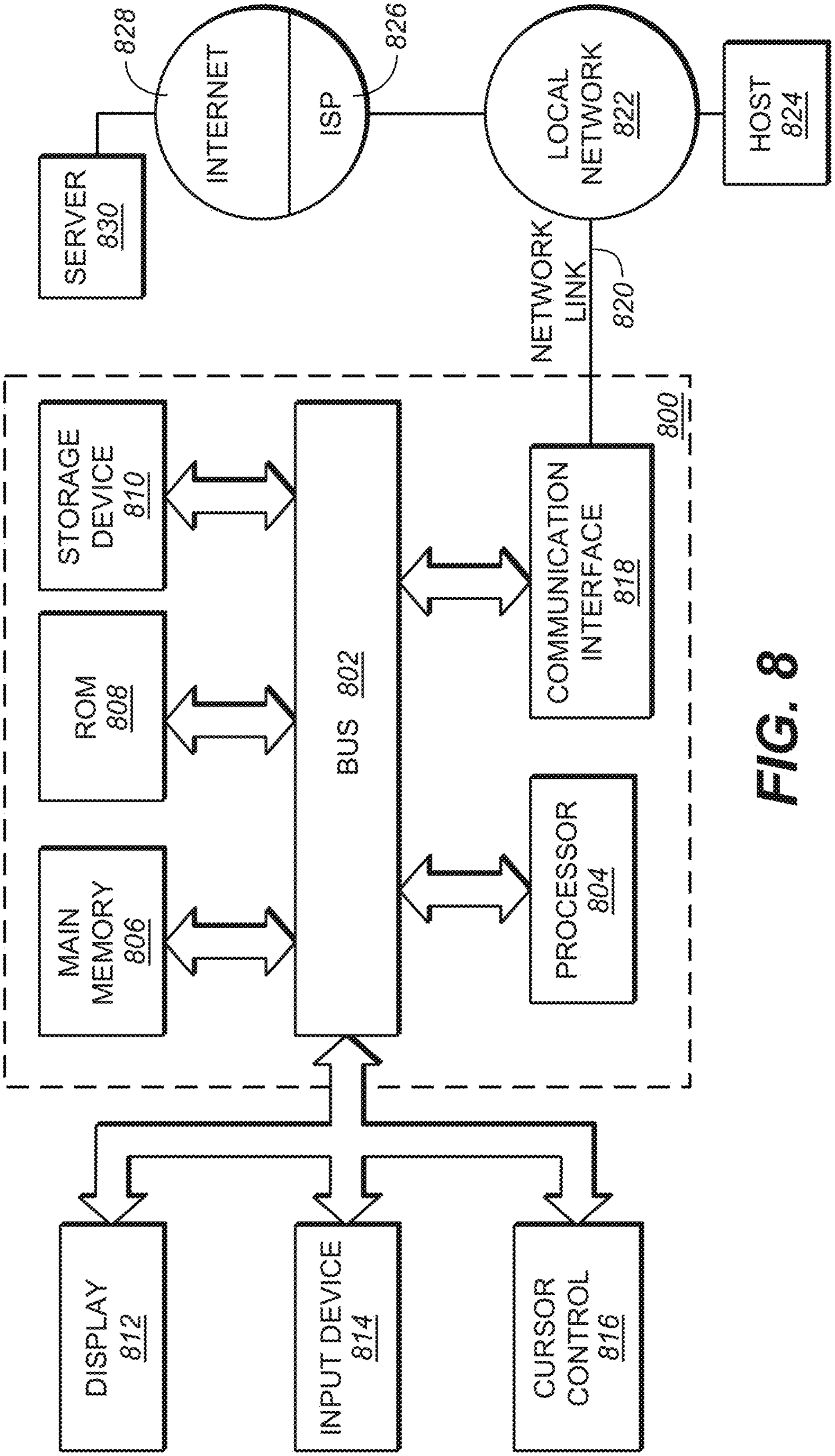
FIG. 8 is a block diagram that illustrates a computer system upon which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In some embodiments, a customer interacts with computer system 800 via touch, for example, by tapping or gesturing over certain locations. A display screen of display 812 may also be capable of detecting touch.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for decoding audio data and metadata, comprising:

receiving, by a media device configured to connect with a plurality of speakers at a media consumption site, an object-based audio item of the audio data and the metadata, wherein the metadata includes positional information for rendering the object-based audio item;

receiving, by the media device, scaling factor metadata;

receiving, by the media device, speaker configuration information relating to positions of the plurality of speakers at the media consumption site;

determining, by the media device, screen information regarding a screen related to the rendering of the object-based audio item;

adjusting, by the media device, the positional information for the object-based audio item based on the screen information in order to determine screen adjusted positional information;

adjusting a gain value based on the scaling factor metadata; and rendering, by the media device, the object-based audio item into channel based loudspeaker signals for the plurality of speakers, wherein the rendering is based on the screen adjusted positional information, for the object-based audio item, the speaker configuration information, and the adjusted gain value for the object-based audio item.

2. The method of claim 1, wherein the screen information relates to screen boundaries.

3. A non-transitory computer readable medium, storing software instructions, which when executed by one or more processors cause performance of claim 1.

4. An apparatus for decoding audio data and metadata, comprising:

a receiver of a media device for receiving an object-based audio item of the audio data, the metadata and speaker configuration information, wherein the media device is configured to connect with a plurality of speakers at a media consumption site, and wherein the metadata includes positional information for rendering the object-based audio item;

a processor of the media device for determining screen information regarding a screen related to the rendering of the object-based audio item and adjusting the positional information for the object-based audio item based on the screen information in order to determine screen adjusted positional information, wherein the processor is further configured to adjust a gain value based on scaling factor metadata; and a renderer of the media device for rendering the object-based audio item into channel based loudspeaker signals for the plurality of speakers, wherein the rendering is based on the screen adjusted positional information for the object-based audio item, the speaker configuration information, and the adjusted gain value for the object-based audio item.

5. The method of claim 1, wherein X dimension information in the screen adjusted positional information indicates an amount of distance to left or right of a center point of screen, and Y dimension information in the screen adjusted positional information indicates an amount of distance behind the screen.

6. The method of claim 1, further comprising:

determining that the object-based audio item is one of a plurality of object-based audio items; and adjusting the gain value of the object-based audio item based on the determination.

* * * * *